(12) United States Patent
Farhat

(10) Patent No.: US 8,399,782 B2
(45) Date of Patent: Mar. 19, 2013

(54) VARIABLE PROPORTIONATE BEAM SCALE FOR PROPORTIONING BAKING RECIPES

(76) Inventor: Dennis Farhat, Rochester Hills, MI (US)

( * ) Notice: Subject to any disclaimer, the term of this patent is extended or adjusted under 35 U.S.C. 154(b) by 848 days.

(21) Appl. No.: 12/564,099

(22) Filed: Sep. 22, 2009

(65) Prior Publication Data

US 2011/0067932 A1 Mar. 24, 2011

(51) Int. Cl.
*G01G 1/18* (2006.01)
(52) U.S. Cl. ............. 177/246; 200/249; 200/251
(58) Field of Classification Search ............ 177/171, 177/172, 199, 200, 246
See application file for complete search history.

(56) References Cited

U.S. PATENT DOCUMENTS

| | | | |
|---|---|---|---|
| 157,233 A | | 11/1874 | Skinner |
| 227,050 A | * | 4/1880 | Palmer ................ 177/200 |
| 657,476 A | | 9/1900 | Brown |
| 697,318 A | | 4/1902 | Brown |
| 1,793,276 A | * | 2/1931 | Chott ................ 177/162 |
| 2,011,649 A | * | 8/1935 | Phillips ................ 177/44 |
| 2,145,515 A | * | 1/1939 | Kucher ................ 177/200 |
| 2,963,286 A | * | 12/1960 | Fischer ................ 177/44 |
| 4,792,002 A | * | 12/1988 | Ward ................ 177/200 |

* cited by examiner

*Primary Examiner* — Peter Macchiarolo
*Assistant Examiner* — Natalie Huls
(74) *Attorney, Agent, or Firm* — Dickinson Wright PLLC

(57) ABSTRACT

A pivot assembly (24) is movably connected to a balance beam (22) between a first and second balancing area (34, 36). The pivot assembly (24) defines a pivot axis (B) being movable relative to a center axis ($A_0$) to define a first variable pivot distance ($Pd_1$) and a second variable pivot distance ($Pd_2$) for proportioning a first and second component according to the concurrently and inversely variable first and second pivot distances ($Pd_1$, $Pd_2$). The balance beam (22) presents a proportioning scale (60) which includes a plurality of identical ratios (62) in scale of the first variable pivot distance ($Pd_1$) to the second variable pivot distance ($Pd_2$) for aligning the pivot assembly (24) with a desired ratio of the first and second components. A first and second pair of retainer walls (38, 40) extend upwardly from the respective balancing areas (34, 36) and diverge from one another for abutting and centering a variety of container sizes on the respective balancing areas (34, 36).

11 Claims, 2 Drawing Sheets

VARIABLE PROPORTIONATE BEAM SCALE FOR PROPORTIONING BAKING RECIPES

BACKGROUND OF THE INVENTION

1. Field of the Invention

The subject invention relates to a beam scale assembly of the type for proportioning a first component in a first container and a second component in a second container.

2. Description of the Prior Art

The beam scale assemblies to which the subject invention pertains are assemblies typically used for proportioning a first component and a second component for use according to a baking recipe, formula, and the like. One such beam scale assembly is disclosed in U.S. Pat. No. 4,792,002 to Ward wherein a balance beam has a first balancing area and a second balancing area for receiving the first and second containers respectively, and a center axis is disposed between the balancing areas.

SUMMARY OF THE INVENTION

The invention provides for a pivot assembly being movably connected to the beam between the first and second balancing areas for moving the pivot assembly a first variable pivot distance relative to the center axis to proportion the first and second components according to the first variable pivot distance of the pivot assembly.

The invention also provides for a method of proportioning the first and second components by moving the pivot assembly a first variable pivot distance relative to the center axis before filling the containers with the first and second components to proportion the first and second components according to the first variable pivot distance.

ADVANTAGES OF THE INVENTION

One advantage of the invention is that it facilitates adjustment of the first variable pivot distance without the need to alter the overall length of the balance beam. Another advantage of the invention is that adjusting the pivot assembly a first variable pivot distance concurrently and inversely varies a second variable pivot distance of the balance beam. As a result, the first and second components are proportioned according to the concurrently and inversely variable first and second pivot distances.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
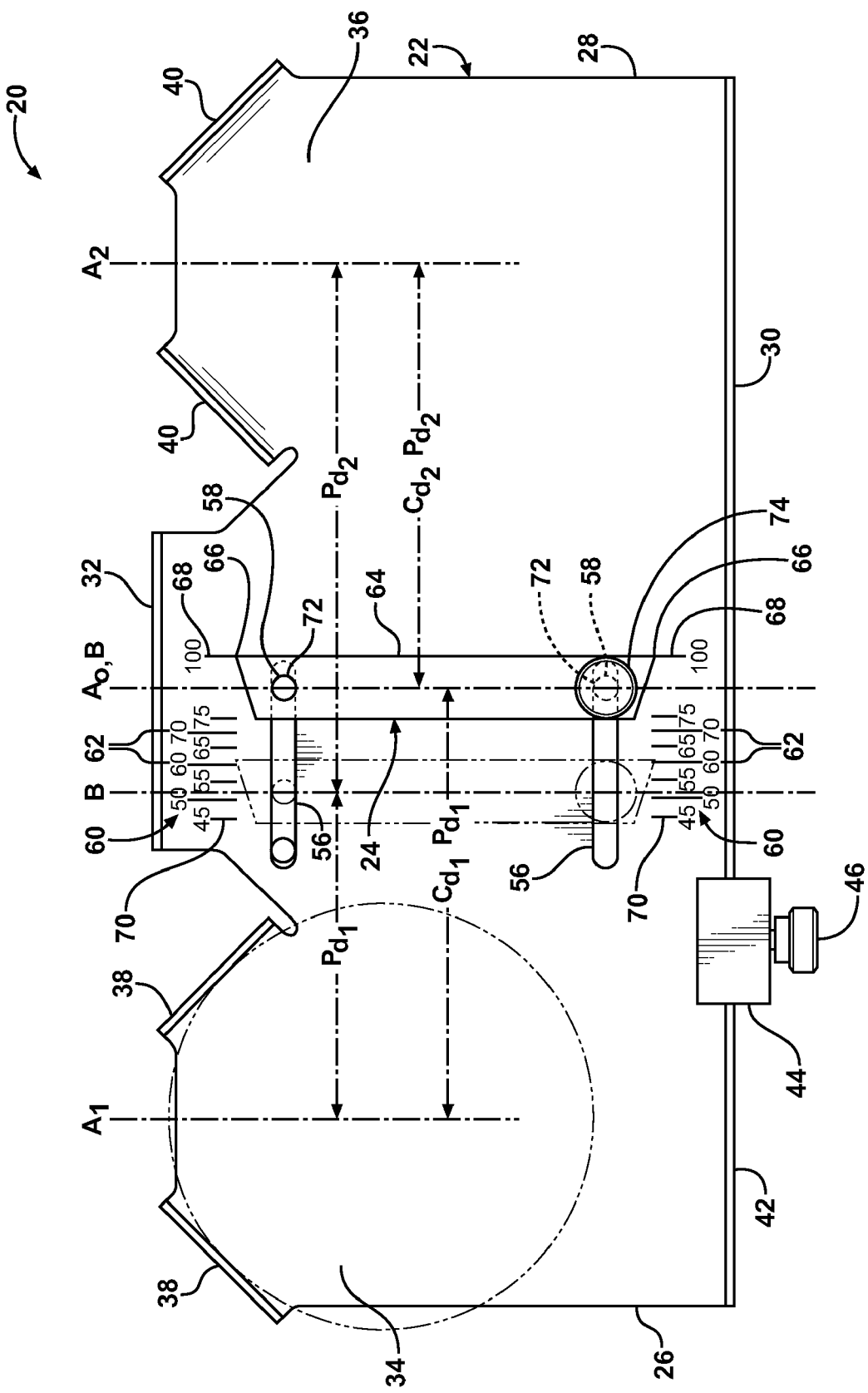
FIG. 1 is a top view of a preferred arrangement of a beam scale assembly showing a pivot assembly movably connected to a balance beam along a proportioning scale between the first and second balancing areas.

Referring to the Figures, wherein like numerals indicate corresponding parts throughout the several views, a beam scale assembly 20 for proportioning a first component in a first container and a second component in a second container is generally indicated at 20. The assembly includes a balance beam 22 for receiving the containers, and a pivot assembly 24 connected to the beam 22 for balancing the components in the containers.

The balance beam 22 extends between a first end 26 and a second end 28 and has a front side 30 and a rear side 32. A center axis $A_0$ extends from the front side 30 to the rear side 32 of the balance beam 22 and is disposed equidistantly between the first and second ends 26, 28 to define a first balancing area 34 between the first end 26 and the center axis $A_0$ and a second balancing area 36 between the second end 28 and the center axis $A_0$ for receiving the first and second containers respectively. The first balancing area 34 has a first axis $A_1$ disposed in spaced and parallel relationship to the center axis $A_0$ to define a first center distance $Cd_1$ between the first axis $A_1$ and the center axis $A_0$. Similarly, the second balancing area 36 has a second axis $A_2$ disposed in spaced and parallel relationship to the center axis $A_0$ to define a second center distance $Cd_2$ between the second axis $A_2$ and the center axis $A_0$, with the second center distance $Cd_2$ being equal to the first center distance $Cd_1$.

To facilitate the use of a variety of container sizes with the beam assembly 20, e.g., containers with different diameters, a first pair of retainer walls 38 diverge from one another and extend upwardly from the rear side 32 of the beam 22 and are centered in mirrored image relationship on the first axis $A_1$. Correspondingly, a second pair of retainer walls 40 diverge from one another and extend upwardly from the rear side 32 of the beam 22 and are centered in mirrored image relationship on the second axis $A_2$. In addition to facilitating the use of variously sized diameters of containers, the retainer walls 38, 40 establish abutting relationship with the containers for centering the container's diameter on the respective first axis $A_1$ and second axis $A_2$. The centering of the containers on their respective axis $A_1$, $A_2$ establishes spacing between the containers and the center axis $A_0$ that is consistent with the respective first and second center distances $Cd_1$, $Cd_2$. As a result, the retainer walls 38, 40 facilitate accurate and reliable proportioning of the first and second components.

A guide rail 42 extends upwardly from the front side 30 of the balance beam 22 and extends transversely to the center axis $A_0$ between the first and second ends 26, 28. A counterweight 44 is slidably disposed on the guide rail 42 for moving the counterweight 44 along the guide rail 42 to establish balance between the empty first and second containers about the pivot assembly 24. The counterweight 44 includes a counterweight locking mechanism 46 interconnecting the guide rail 42 and the counterweight 44 to prevent movement of the counterweight 44 along the guide rail 42 once balance between the empty containers has been established.

Figure 2:
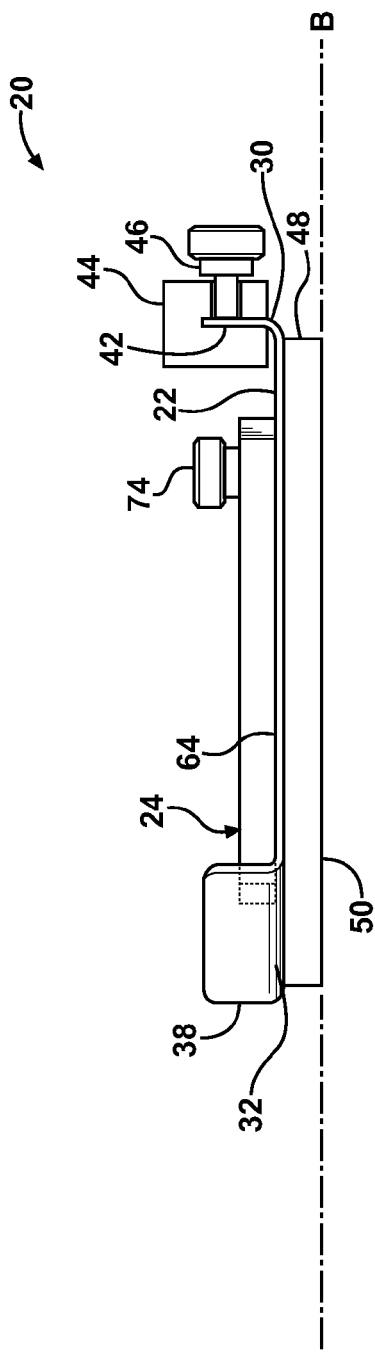
FIG. 2 is a side view of the beam scale assembly.
Figure 3:
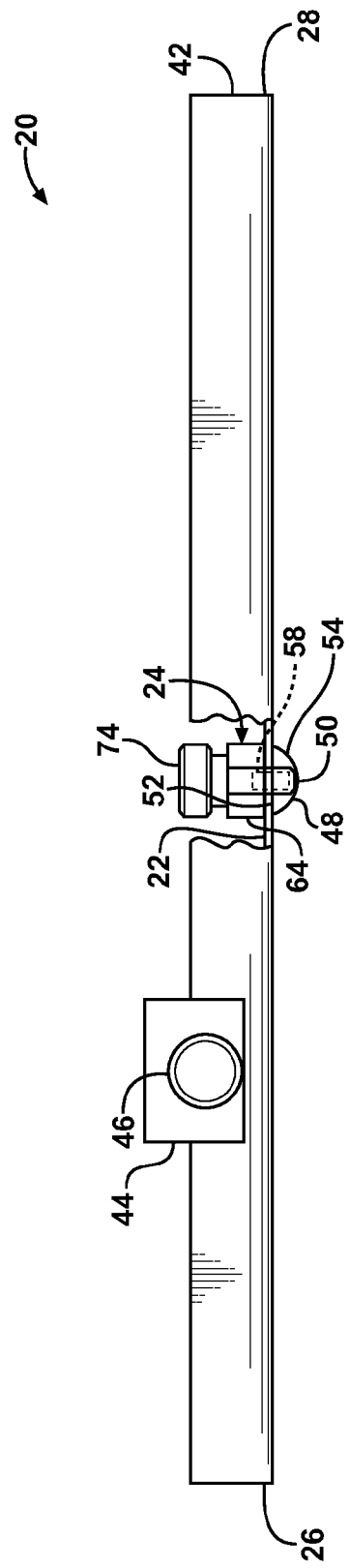
FIG. 3 is a front view of the beam scale assembly showing the balance beam clamped between a pivot and a tie-bar of the pivot assembly.

As shown in FIGS. 2 and 3, the pivot assembly 24 includes a pivot 48 extending downwardly from the balance beam 22 to a pivot edge 50 defining a pivot axis B. The pivot 48 is disposed between the first and second ends 26, 28 of the beam 22 and extends continuously from next adjacent the front side 30 to next adjacent the rear side 32. The pivot 48 has a cross-section being semi-circular to define a flat surface 52 for supporting the beam 22 and a circular support surface 54 to establish a rocking movement of the beam 22. In addition, the pivot 48 is movable relative to the center axis $A_0$ to define a first variable pivot distance $Pd_1$ between the first axis $A_1$ and the pivot axis B and a second variable pivot distance $Pd_2$ between the second axis $A_2$ and the pivot axis B.

To establish movement of the pivot 48 relative to the center axis $A_0$, the beam 22 defines a pair of a slot guides 56 disposed in spaced and parallel relationship and extending transversely to the center axis $A_0$, and the pivot assembly 24 includes a pair of guide pins 58 extending upwardly from the pivot 48 and through the slot guides 56 of the beam 22. As shown in phantom in FIG. 1, the movement of the pivot 48 along the beam 22 adjusts the position of the pivot axis B relative to the center axis $A_0$ for concurrently and inversely varying the first and second pivot distances $Pd_1$, $Pd_2$ in response to the repositioning of the pivot axis B along the slot guides 56.

To facilitate proportioning of the first and second components, the beam 22 presents a proportioning scale 60 disposed between each of the guides 56 and each of the front and rear sides 30, 32 which includes a plurality of identical ratios 62 in scale of the first variable pivot distance $Pd_1$ to the second pivot distance $Pd_2$. Correspondingly, the pivot assembly 24 includes a tie-bar 64 in sliding engagement with the beam 22 and being trapezoidal to define a proportioning point 66 at each end. The proportioning scales 60 incrementally decrease in ratio from a one-to-one ratio 68 at 100% to a predetermined lesser ratio 70 for aligning the proportioning point 66 of the tie-bar 64 with the ratios 62 to proportion the first and second components according to the inversely variable first and second pivot distances $Pd_1$, $Pd_2$. For example, the proportioning scale 60 is designed so that the one-to-one ratio 68 at 100% is aligned with the proportioning point 66 of the tie-bar 64 when the pivot axis B is aligned with the center axis $A_0$ for achieving a desired proportion of 1 unit of the first component to 1 unit of the second component. As another example, when the proportioning point 66 is aligned with the ratio at 75%, the desired proportion is 4 units of the first component to 3 units of the second component. Also, when the proportioning point 66 is aligned with the ratio at 50%, the desired proportion is 2 units of the first component to 1 unit of the second component. Similar calculations can be determined for each of the ratios 62.

The tie-bar 64 extends outwardly from the slot guides 56 and defines holes 72 with the guide pins 58 extending through the holes 72. A pivot locking mechanism 74 is disposed on each of the guide pins 58 above the tie-bar 64 for clamping the beam 22 between the pivot 48 and the tie-bar 64 to prevent further movement of the pivot axis B relative to the proportioning scale 60 when a desired ratio 62 of the first and second components has been selected.

The invention also includes a method of proportioning a first component and a second component on a balance beam 22 having a center axis $A_0$ between a first balancing area 34 and a second balancing area 36 by balancing the components about a pivot axis B.

The method comprises the steps of establishing a proportioning scale 60 of ratios 62 of components on the balance beam 22. The method proceeds by moving the pivot axis B a first pivot distance $Pd_1$ relative to the center axis $A_0$ to select a desired ratio 62 of the first and second components along the scale 60 for proportioning the first and second components according to the first pivot distance $Pd_1$ of the pivot axis B. Once the desired ratio 62 has been selected, the pivot axis B is locked to the balance beam 22 for preventing further movement of the pivot axis B relative to the proportioning scale 60. After locking the pivot axis B, a first and second container are disposed on the first and second balancing areas 34, 36 respectively. A counterweight 44 is then moved along a guide rail 42 to establish balance between the empty first and second containers about the pivot axis B. Once balance is achieved, mechanical interlocking engagement between the guide rail 42 and the counterweight 44 is established to prevent further movement of the counterweight 44 along the guide rail 42. The method proceeds by filling the first and second containers with the first and second components respectively, and the filling of the first and second containers includes modifying the amount of the first and second components in the respective containers to balance the beam 22 about the pivot axis B for achieving the desired proportion of the first and second components.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

| ELEMENT LIST | |
|---|---|
| Element Symbol | Element Name |
| 20 | beam scale assembly |
| 22 | balance beam |
| 24 | pivot assembly |
| 26 | first end |
| 28 | second end |
| 30 | front side |
| 32 | rear side |
| 34 | first balancing area |
| 36 | second balancing area |
| 38 | first pair of retainer walls |
| 40 | second pair of retainer walls |
| 42 | guide rail |
| 44 | counterweight |
| 46 | counterweight locking mechanism |
| 48 | pivot |
| 50 | pivot edge |
| 52 | flat surface |
| 54 | circular support surface |
| 56 | slot guides |
| 58 | guide pins |
| 60 | proportioning scale |
| 62 | plurality of identical ratios |
| 64 | tie-bar |
| 66 | proportioning point |
| 68 | one-to-one ratio |
| 70 | predetermined lesser ratio |
| 72 | holes |
| 74 | pivot locking mechanism |
| $A_0$ | center axis |
| $A_1$ | first axis |
| $A_2$ | second axis |
| B | pivot axis |
| $Cd_1$ | first center distance |
| $Cd_2$ | second center distance |
| $Pd_1$ | first variable pivot distance |
| $Pd_2$ | second variable pivot distance |

What is claimed is:

1. A beam scale assembly (20) for proportioning a first component in a first container and a second component in a second container and comprising:

a balance beam (22) having a first balancing area (34) and a second balancing area (36) for receiving the first and second containers respectively, said balance beam (22) having a center axis ($A_0$) disposed between said balancing areas (34, 36), said first balancing area (34) including a first axis ($A_1$) disposed in spaced and parallel relationship to said center axis ($A_0$) and said second balancing area (36) including a second axis ($A_2$) disposed in spaced and parallel relationship to said center axis ($A_0$), and characterized by a pivot assembly (24) including a pivot (48) extending downwardly from said balance beam (22) to a pivot edge (50) defining a pivot axis (B) and having a cross-section being semi-circular to define a flat surface (52) for supporting said balance beam (22) and a circular support surface (54) to establish a rocking movement of said balance beam (22), and said pivot assembly being movably connected to said balance beam (22) between said first and second balancing areas (34, 36) for moving said pivot assembly (24) relative to said center axis ($A_0$) to define a first variable pivot distance ($Pd_1$) between said first axis ($A_1$) and said pivot axis (B) and a second variable pivot distance ($Pd_2$) between said second axis ($A_2$) and said pivot axis (B) to proportion the first and second components according to said first variable pivot distance ($Pd_1$) and said second variable pivot distance ($Pd_2$) of said pivot assembly (24).

2. An assembly as set forth in claim 1 wherein said center axis ($A_0$) intersects the center of gravity of said balance beam (22) for establishing balance between said first and second balancing areas (34, 36) when said pivot axis (B) is aligned with said center axis ($A_0$).

3. An assembly as set forth in claim 2 wherein each of said first and second balancing areas (34, 36) include a pair of retainer walls (38, 40) diverging from one another and extending upwardly from said beam (22) and centered in mirrored image relationship on said respective axis ($A_1, A_2$) for abutting and centering the first and second containers on said respective axis ($A_1, A_2$).

4. An assembly as set forth in claim 3 wherein said first axis ($A_1$) defines a first center distance ($Cd_1$) between said first axis ($A_1$) and said center axis ($A_0$), and said second axis ($A_2$) defines a second center distance ($Cd_2$) between said second axis ($A_2$) and said center axis ($A_0$), and said second center distance ($Cd_2$) being equal to said first center distance ($Cd_1$) for establishing a one-to-one ratio (68) of said first and second variable pivot distances ($Pd_1, Pd_2$) when said pivot axis (B) is aligned with said center axis ($A_0$).

5. An assembly as set forth in claim 4 wherein said balance beam (22) presents a proportioning scale (60) including a plurality of said ratios (62) in scale and incrementally decreasing in ratio from said one-to-one ratio (68) at 100% to a predetermined lesser ratio (70), and said pivot assembly (24) including a proportioning point (66) for aligning said proportioning point (66) with said ratios (62) to proportion the first and second components according to said inversely variable first and second pivot distances ($Pd_1, Pd_2$) with said one-to-one ratio (68) of 100% aligned with said proportioning point (66) when said pivot axis (B) is aligned with said center axis ($A_0$).

6. An assembly as set forth in claim 5 wherein said balance beam (22) defines a pair of slot guides (56) disposed in spaced and parallel relationship and extending transversely to said center axis ($A_0$), and said pivot assembly (24) includes a pair of guide pins (58) extending upwardly from said pivot (48) through said slot guides (56) of said balance beam (22) for establishing the movement of said pivot assembly (24) relative to said center axis ($A_0$).

7. An assembly as set forth in claim 6 wherein said pivot assembly (24) includes a tie-bar (64) in sliding engagement with said beam (22) and being trapezoidal to define said proportioning point (66) at each end and extending outwardly from said slot guides (56) and defining holes (72) with said guide pins (58) extending through said holes (72).

8. An assembly as set forth in claim 7 wherein said pivot assembly (24) includes a pivot locking mechanism (74) on each of said guide pins (58) above said tie-bar (64) for clamping said beam (22) between said pivot (48) and said tie-bar (64).

9. An assembly as set forth in claim 8 wherein said balance beam (22) includes a guide rail (42) extending upwardly from said beam (22) and extending transversely to said center axis ($A_0$), and a counterweight (44) slidably disposed on said guide rail (42) for moving said counterweight (44) along said guide rail (42) to establish balance between the empty first and second containers about said pivot (48).

10. An assembly as set forth in claim 9 wherein said counterweight (44) includes a counterweight locking mechanism (46) interconnecting said guide rail (42) and said counterweight (44) to prevent movement of said counterweight (44) along said guide rail (42).

11. A beam scale assembly (20) for proportioning a first component in a first container and a second component in a second container and comprising:

a balance beam (22) for receiving the containers, a pivot assembly (24) being connected to said beam (22) for balancing the components in the containers, said balance beam (22) extending between a first end (26) and a second end (28) and having a front side (30) and a rear side (32) and having a center axis ($A_0$) extending from said front side (30) to said rear side (32) and disposed equidistantly between said first and second ends (26, 28) to define a first balancing area (34) disposed between said first end (26) and said center axis ($A_0$) and a second balancing area (36) disposed between said second end (28) and said center axis ($A_0$) for receiving the first and second containers respectively, said first balancing area (34) having a first axis ($A_1$) disposed in spaced and parallel relationship to said center axis ($A_0$) to define a first center distance ($Cd_1$) between said first axis ($A_1$) and said center axis ($A_0$), said second balancing area (36) having a second axis ($A_2$) disposed in spaced and parallel relationship to said center axis ($A_0$) to define a second center distance ($Cd_2$) between said second axis ($A_2$) and said center axis ($A_0$), said second center distance ($Cd_2$) being equal to said first center distance ($Cd_1$), a guide rail (42) extending upwardly from said front side (30) of said balance beam (22) and extending transversely to said center axis ($A_0$) between said first and second ends (26, 28), a counterweight (44) slidably disposed on said guide rail (42) for moving said counterweight (44) along said guide rail (42) to establish balance between the empty first and second containers about said pivot (48), and said counterweight (44) including a counterweight locking mechanism (46) interconnecting said guide rail (42) and said counterweight (44) to prevent movement of said counterweight (44) along said guide rail (42), and characterized by a pivot assembly (24) including a pivot (48) extending downwardly from said balance beam (22) to a pivot edge (50) defining a pivot axis (B) and disposed midway between said first and second ends (26, 28) and extending continuously from next adjacent said front side (30) to next adjacent said rear side (32) and movable relative to said center axis ($A_0$) to define a first variable pivot distance ($Pd_1$) between said first axis ($A_1$) and said pivot axis (B) and a second variable pivot distance ($Pd_2$) between said second axis ($A_2$) and said pivot axis (B) and having a cross-section being semi-circular to define a flat surface (52) for supporting said beam (22) and a circular support surface (54) to establish a rocking movement of said beam (22), a first pair of retainer walls (38) diverging from one another and extending upwardly from said rear side (32) of said beam (22) and centered in mirrored image relationship on said first axis ($A_1$) for abutting and centering the first container on said first axis ($A_1$) in said first area, a second pair of retainer walls (40) diverging from one another and extending upwardly from said rear side (32) of said beam (22) and centered in mirrored image relationship on said second axis ($A_2$) for abutting and centering the first container on said second axis ($A_2$) in said second area, said beam (22) defining a pair of a slot guides (56) disposed in spaced and parallel relationship and extending transversely to said center axis ($A_0$), said pivot assembly (24) including a pair of guide pins (58) extending upwardly from said pivot (48) and through said slot guides (56) of said beam (22) for moving said pivot (48) along said beam (22) to adjust the position of said pivot axis (B) relative to said center axis ($A_0$) for concurrently and inversely varying said first and second pivot distances ($Pd_1$, $Pd_2$) in response to said repositioning of said pivot axis (B) along said slot guides (56), said pivot assembly (24) including a tie-bar (64) in sliding engagement with said beam (22) and being trapezoidal to define a proportioning point (66) at each end and extending outwardly from said slot guides (56) and defining holes (72) with said guide pins (58) extending through said holes (72), said pivot assembly (24) including a pivot locking mechanism (74) on each of said guide pins (58) above said tie-bar (64) for clamping said beam (22) between said pivot (48) and said tie-bar (64), said beam (22) presenting a proportioning scale (60) disposed between each of said guides (56) and each of said front and rear sides (30, 32), and said proportioning scales (60) including a plurality of identical ratios (62) in scale of said first variable pivot distance ($Pd_1$) to said second variable pivot distance ($Pd_2$) and incrementally decreasing in ratio from a one-to-one ratio (68) at 100% to a predetermined lesser ratio (70) for aligning said proportioning point (66) of said tie-bar (64) with said ratios (62) to proportion the first and second components according to said inversely variable first and second pivot distances ($Pd_1$, $Pd_2$) with said one-to-one ratio (68) of 100% aligned with said proportioning point (66) of said tie-bar (64) when said pivot axis (B) is aligned with said center axis ($A_0$).

\* \* \* \* \*